(12) United States Patent
Honda et al.

(10) Patent No.: US 6,851,091 B1
(45) Date of Patent: Feb. 1, 2005

(54) IMAGE DISPLAY APPARATUS AND METHOD

(75) Inventors: Fumitaka Honda, Chiba (JP); Koji Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/573,719

(22) Filed: May 15, 2000

Related U.S. Application Data

(63) Continuation of application No. PCT/JP98/04193, filed on Sep. 17, 1998.

(51) Int. Cl.$^7$ .................................................. G06F 3/00
(52) U.S. Cl. ..................... 715/721; 715/720; 715/722; 715/723
(58) Field of Search ................................ 345/619, 625, 345/629, 632, 642, 662, 474, 475, 704, 723, 726, 732, 797, 707, 716, 717, 718, 719, 720, 721, 722, 724, 725

(56) References Cited

U.S. PATENT DOCUMENTS

| | | | |
|---|---|---|---|
| 5,459,830 A | * | 10/1995 | Ohba et al. .................. 345/473 |
| 5,974,218 A | * | 10/1999 | Nagasaka et al. ............. 386/46 |
| 6,014,170 A | * | 1/2000 | Pont et al. ............... 348/231.4 |
| 6,268,854 B1 | * | 7/2001 | Borden et al. .............. 345/784 |
| 6,377,745 B2 | * | 4/2002 | Akiba et al. ................... 386/68 |
| 6,445,876 B1 | * | 9/2002 | Dosaka ......................... 386/77 |
| 6,526,219 B1 | * | 2/2003 | Posa et al. ..................... 386/68 |

FOREIGN PATENT DOCUMENTS

| | | |
|---|---|---|
| JP | 2-260075 | 10/1990 |
| JP | 6-110943 | 4/1994 |

OTHER PUBLICATIONS

Rainer Lienhart, "Automatic Text Recognition for Video Indexing," ACM Multimedia 1996.*

Muranoi et al., "Construction of Hierarchical Video Browser Using Extraction of Scene of Movie", Research Report of Information Processing Society of Japan, vol. 97, No. 89, pp. 29–34, Sep. 12, 1997.

Ueda et al., "Visualization and Application of Video Structure Based on Dynamic Image Analysis", The Transaction of IEICE, vol. J76–D–II, No. 8, pp. 1572–1580, Aug. 25, 1993.

* cited by examiner

Primary Examiner—Raymond J. Bayerl
Assistant Examiner—Tadesse Hailu
(74) Attorney, Agent, or Firm—Frommer Lawrence & Haug LLP; William S. Frommer

(57) ABSTRACT

An imaging device capable of displaying an outline of a moving picture as a still picture is realized. Further, reproduction of a moving picture that is started from any desired scene by using an index picture can be realized. When VD index pictures displayed on a browser screen are selected, a corresponding index representative still picture is displayed. Therefore, a moving picture such as a moving picture of a quick motion whose contents cannot be easily grasped only by the VD index picture, can be easily recognized with the addition of the corresponding index representative still picture. By selecting the VD index pictures displayed on the browser screen, display of the corresponding moving picture is started from a portion corresponding to the selected VD index picture.

11 Claims, 9 Drawing Sheets

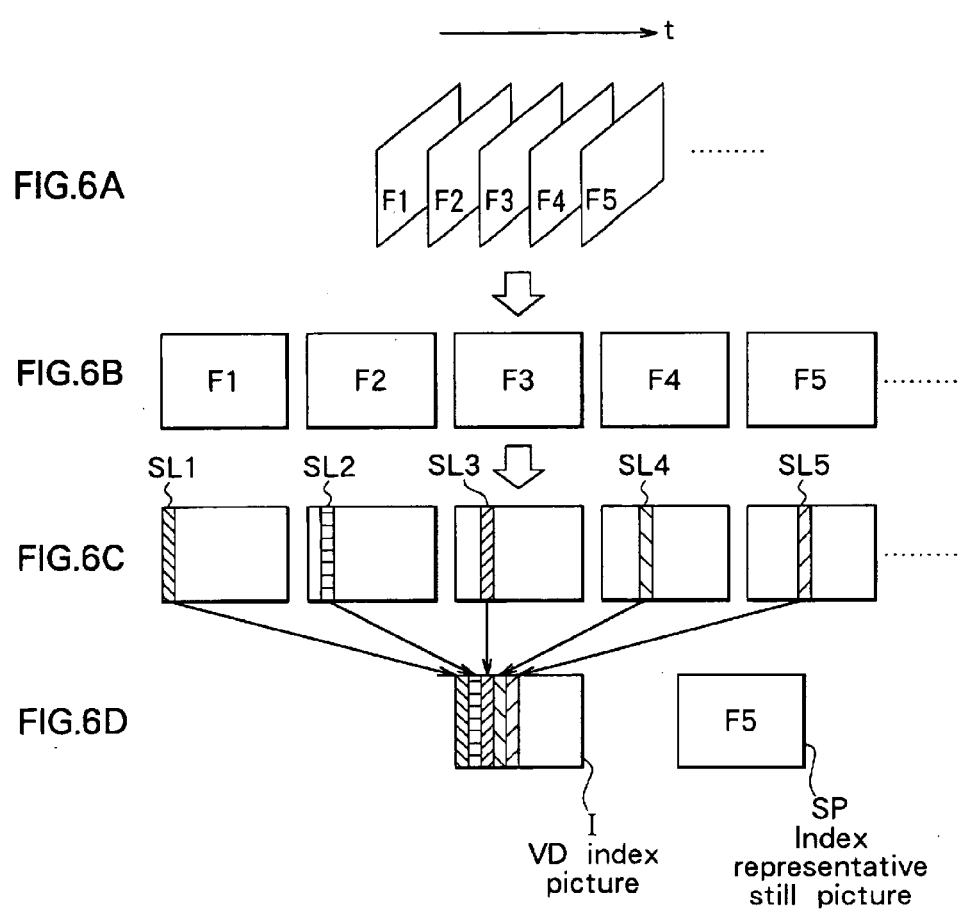

| Database server | Web server | Terminal device | Moving picture server |
|---|---|---|---|
| | | activate Internet browser unit (S1) | |
| | | access web server (S2) | |
| | read homepage for moving picture retrieval from GUI data storing unit and distribute it to terminal device (S3) | | |
| | | display homepage for moving picture retrieval (S4) | |
| | | enter keyword (S5) | |
| | | transmit keyword together with moving picture retrieval request to web server (S6) | |
| | activate database searching unit and transmit moving picture information retrieval command code together with keyword to database server (S7) | | |
| retrieve moving picture information and transmit retrieval result to web server (S8) | | | |
| | activate index retrieving unit and retrieve corresponding VD index file from index storing unit on the basis of retrieval result from database server (S9) | | |
| | generate GUI data on the basis of retrieval result from database server and retrieval result from index storing unit (S10) | | |
| | transmit GUI data as retrieval result to terminal device (S11) | | |
| | | display GUI data on browser (S12) | |

FIG.7

| Database server | Web server | Terminal device | Moving picture server |
|---|---|---|---|
| | | obtain information specifying mouse-pointed VD index picture (S13) | |
| | | transmit transmission request of index representative still picture together with index specifying information to web server (S14) | |
| | capture requested index representative still picture from still picture storing unit and transmit it to terminal device (S15) | | |
| | | receive index representative still picture and display it on browser (S16) | |
| | | obtain information specifying mouse-clicked VD index picture (S17) | |
| | | transmit transmission request of moving picture reproduction command code together with VD index specifying information to web server (S18) | |
| | generate moving picture reproduction command code including moving picture file name, moving picture file storing position, reproduction start position and the like on the basis of received VD index specifying information and transmit it to terminal device (S19) | | |
| | | receive moving picture reproduction command code and, on the basis of it, request moving picture server to distribute moving picture (S20) | |
| | | | distribute corresponding moving picture to terminal device on the basis of moving picture reproduction command code (S21) |
| | | display distributed moving picture on browser (S22) | |

FIG.8

IMAGE DISPLAY APPARATUS AND METHOD

This is a continuation of copending International Application PCT/JP98/04193 having an international filing date of 17 September 1998.

1. Technical Field

The present invention relates to an image display apparatus capable of displaying an outline of a moving picture as a still picture. For example, the invention relates to an image display apparatus applied to a system of retrieving a desired moving picture from a plurality of kinds of moving pictures.

2. Background Art

Conventionally, an information retrieving technique intended for characters is widely used. However, with respect to a retrieving technique intended for video image, there are few realized examples and various attempts are still being made at present. Among them, moving picture retrieving methods such as a method using an image recognizing technique, a method using a scene extracting technique, and the like have been being studied from various viewpoints.

For example, in a VOD (Video On Demand) system in which a moving picture server and a database server are combined, the contents (of a moving picture) can be retrieved by a keyword retrieval of a title name or the like. The title name, however, does not always properly express the contents. Under the present circumstances, in many cases, the contents can be recognized as a result from playing them back.

In order to solve the problem, as disclosed in Japanese Unexamined Patent Application No. 2-260075, the applicant of the invention has proposed a video browser technique with a view to showing a moving picture so as to be recognized at sight. According to the video browser technique, index pictures as so-called digest still pictures are generated on the basis of partial images sampled from each of a series of still pictures which form a moving picture through a moving slit window and are listed in accordance with the time, thereby enabling the outline contents of the moving picture to be recognized at a glance.

By the video browser technique, since the contents of a moving picture of an enormous amount recorded in an invisible state are displayed in the form of still pictures compressed according to the time, the contents of the moving picture can be immediately grasped.

When a short image or a quick motion image is included in a moving picture, however, it is difficult to accurately recognize the contents of the short image from an index picture generated in the video browser technique.

Although the above-described VOD system does not generally have the function of reproducing a moving picture from a some midpoint, if the system has such a function, it is more convenient. The function of reproducing a moving picture from a some midpoint can be realized by, for example, displaying a scroll bar having a length corresponding to the length of the moving picture, dragging the cursor on the scroll bar by using a mouse or the like, and starting reproduction of the moving picture from the cursor position.

In the case of reproducing the moving image from a some, midpoint by the method, however, the user has to move the cursor on the scroll bar by his/her feeling to designate the reproduction start position. It is difficult to start reproduction from a desired scene.

DISCLOSURE OF INVENTION

The invention has been achieved in consideration of the problems and its first object is to provide an image display apparatus and method which enables the contents of even a moving picture of quick motion or a short moving picture which cannot be easily grasped only from an index picture generated by the video browser technique to be accurately grasped.

A second object of the invention is to provide an image display apparatus and method which enables reproduction to be started accurately from a desired scene by using an index picture generated by the video browser technique.

An image display apparatus of the invention comprises: index picture holding means for holding an index picture summarized as a still picture by combining respective parts of a plurality of still pictures arranged in time sequence so as to construct a moving picture; index contents information holding means for holding index contents information regarding the contents of each of index pictures generated by the index picture generating means; display means having a first display area for displaying the index picture held by the index picture holding means and a second display area for displaying the index contents information held in the index contents information holding means; and control means for controlling a display operation in the display means.

The image display apparatus according to the invention further comprises selecting means for selecting any of the index pictures displayed in the first display area, and the control means has a function of reading the index contents information regarding the index picture selected by the selecting means from the index contents information holding means and displaying the read information in the second display area.

According to the image display apparatus of the invention, the index contents information may be of any of still pictures used to generate a corresponding index picture.

According to the image display apparatus of the invention, the index contents information may be of a moving picture as a source of the index picture.

According to the image display apparatus of the invention, the index contents information may be of a moving picture as a source of the index picture, and the control means can control the display means so as to start reproduction and display of the moving picture from a part corresponding to the index picture selected by the selecting means.

According to the image display apparatus of the invention, the index contents information may be index related information which is information related to a corresponding index picture.

An image displaying method of the invention comprises the steps of: generating an index picture summarized as a still picture by combining respective parts of a plurality of still pictures arranged in time sequence so as to construct the moving picture; holding index contents information regarding the contents of each of index pictures; displaying the generated index pictures in time sequence; selecting one of the displayed index pictures; and displaying the index contents information corresponding to the selected index picture.

According to the image displaying method of the invention, the index contents information may be of any of still pictures used to generate a corresponding index picture.

According to the image displaying method of the invention, the index contents information may be of a moving picture as a source of the index picture.

According to the image displaying method of the invention, the index contents information may be of a moving picture as a source of the index picture, and reproduction and display of the moving picture can be started from a part corresponding to the selected index picture.

According to the image displaying method of the invention, the index contents information may be index related information related to a corresponding index picture.

In the image display apparatus of the invention, index contents information regarding the contents of an index picture is held every index picture generated by summarizing a moving picture, and an operation of displaying the index picture to a first display area of display means and an operation of displaying the index contents information to a second display area of the display means are controlled by control means.

In the image displaying method of the invention, an index picture is generated by summarizing a moving picture and index contents information regarding the contents of an index picture is held every index picture generated. The index pictures are displayed in time sequence. When any of the displayed index pictures is selected, the index contents information corresponding to the selected index picture is displayed.

Other and further objects, features and advantages of the invention will appear more fully from the following description.

BRIEF DESCRIPTION OF DRAWINGS

FIGS. 6A to 6D are explanatory diagrams showing a procedure of generating one VD index picture from moving pictures in a section.

FIG. 7 is an explanatory diagram showing a series of moving picture retrieving and distributing operations in each of a web server, a terminal device, a moving picture server, and a database server.

FIG. 8 is an explanatory diagram continued from FIG. 7.

BEST MODE FOR CARRYING OUT THE INVENTION

Figure 1:
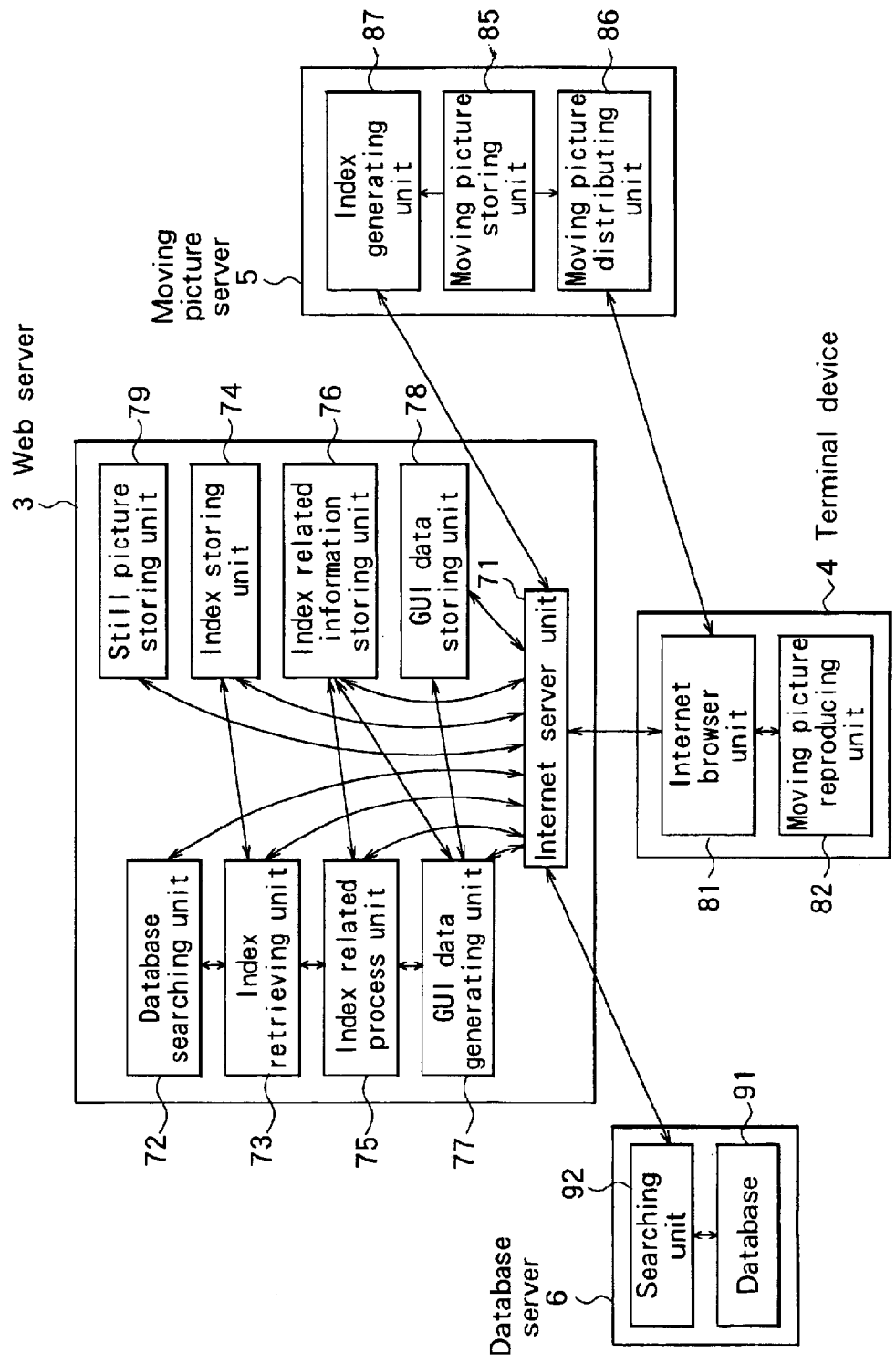
FIG. 1 is a block diagram showing the functional configuration of components in a moving picture retrieving and distributing system to which an image display apparatus of an embodiment of the invention is applied.

Embodiments of the invention will be described in detail hereinbelow by referring to the drawings.

Figure 2:
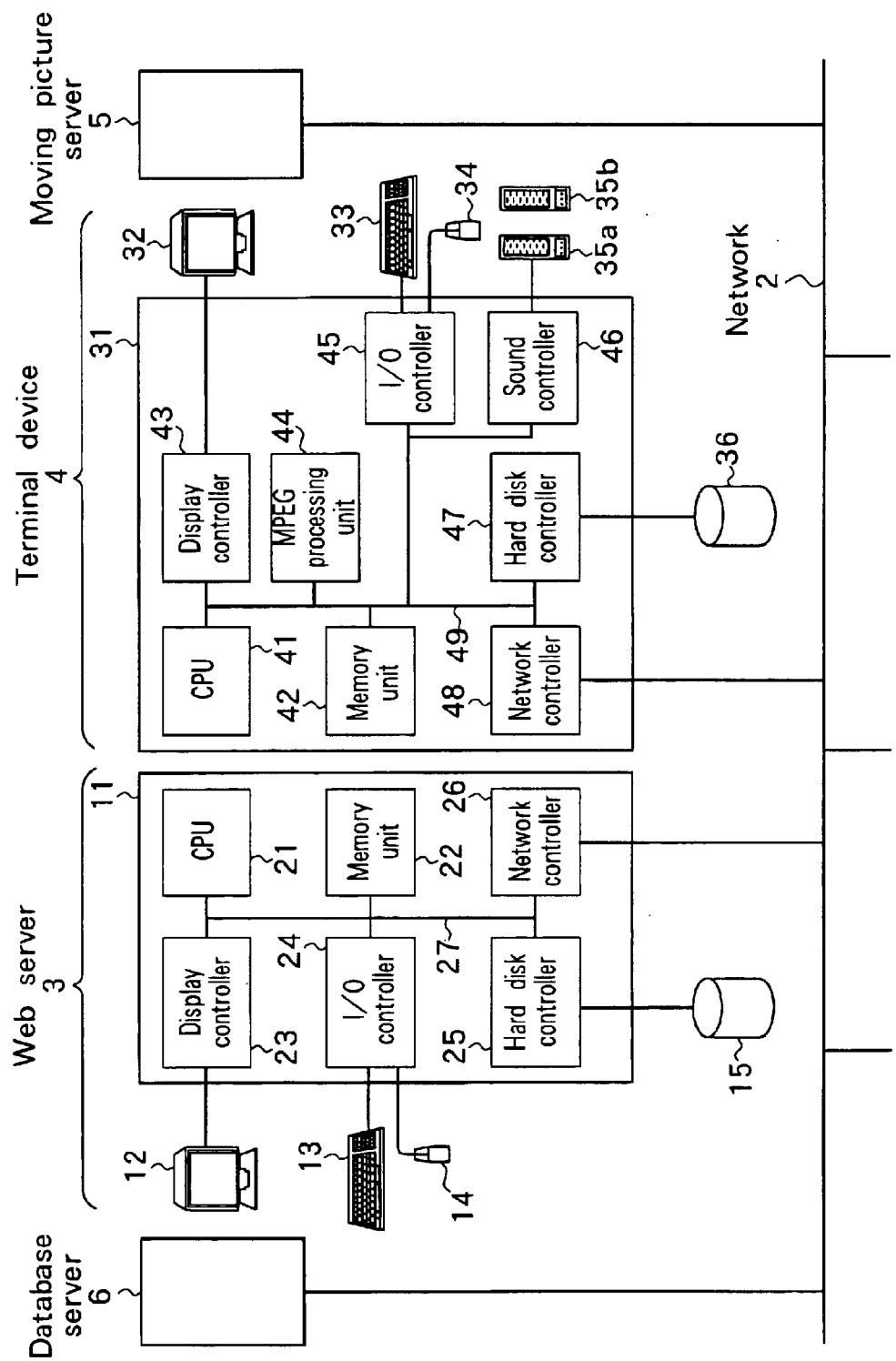
FIG. 2 is a block diagram showing the hardware configuration of the moving picture retrieving and distributing system together with the hardware configuration of a web server and a terminal device as components of the system.

FIG. 2 shows the hardware configuration of a moving picture retrieving and distributing system to which an image display apparatus according to an embodiment of the invention is applied together with internal configurations of a web server 3 and a terminal device 4 as components of the system. The moving picture retrieving and distributing system of the embodiment is a system capable of retrieving and distributing a moving picture by using the world wide web (WWW) as a system which makes an access to information on the Internet possible.

As shown in the diagram, the moving picture retrieving and distributing system comprises the web server 3 for supporting the WWW, the terminal device 4 as a client, a moving picture server 5 for, storing a moving picture, and a database server 6 for storing data which is related to the moving picture stored in the moving picture server 5. Each of the components are connected to a network 2 as a part of the Internet. The number of each of the web server 3, terminal device 4, moving picture server 5 and database server 6, connected to the network 2, and the physical a connection form of the components to the network 2 are not especially limited.

The web server 3 mainly retrieves a moving picture or retrieves and distributes vidual digest index pictures (hereinbelow, referred to as VD index pictures) as still pictures generated from a moving picture in accordance with a request from the terminal device 4. The VD index pictures are obtained by summarizing the contents of the moving picture into the form of still pictures. Only by seeing the VD index pictures, the rough contents of the moving picture can be grasped. The generating method will be described hereinlater. The VD index picture corresponds to an example of an "index picture" in the invention.

As shown in FIG. 2, the web server 3 comprises a computer unit 11, and a display apparatus 12, a keyboard 13, a mouse 14 and a hard disk drive 15, which are connected to the computer unit 11. The computer unit 11 comprises: a CPU (central processing unit) 21; a memory unit 22 including a ROM (read only memory) and a RAM (random access memory); a display controller 23 for controlling the display apparatus 12; an I/O controller 24 connected to the keyboard 13 and the mouse 14, for controlling an input/output (I/O) operation; a hard disk controller 25 for controlling the hard disk drive 15; and a network controller 26 connected to the network 2, for controlling communications. The components are connected to each other via a bus 27. The CPU 21 executes an application program stored in the hard disk drive 15 by using the RAM in the memory unit 22 as a working memory area.

The terminal device 4 is, an ordinary personal computer, for example, and has an Internet browser as software which makes information on the Internet browsable and a moving picture reproducing program as software for enabling the moving picture distributed via the network 2 to be reproduced. As the Internet browser, for instance, a general commercial browser such as Netscape Navigator (trademark of Netscape Communications, U.S.A.) can be used.

As shown in FIG. 2, the terminal device 4 comprises a computer unit 31, and a display apparatus 32, a keyboard 33, a mouse 34, speakers 35a and 35b, and a hard disk drive 36, which are connected to the computer body 31. The computer body 31 comprises: a CPU 41; a memory unit 42 including a ROM, a RAM, and the like; a display controller 43 for controlling the display apparatus 32; an MPEG processing unit 44 for compressing and decompressing image data in compliance with the MPEG (Moving Picture Experts Group) standard; an I/O controller 45 connected to the keyboard 33 and the mouse 34, for controlling an input/output operation; a sound controller 46 for controlling sound outputs from the speakers 35a and 35b; a hard disk controller 47 for controlling the hard disk drive 36; and a network controller 48 connected to the network 2, for controlling communications. The components are connected to each other via a bus 49. The CPU 41 executes an application program stored in the hard disk drive 36 by using the RAM in the memory unit 42 as a working memory area. The MPEG processing unit 44 can be realized by either hardware or software.

As long as the Internet browser function and the moving picture reproducing function as described above are provided, the terminal device 4 is not limited to certain hardware configuration.

The moving picture server 5 stores a plurality of kinds of moving pictures, provides the moving picture via the network 2 in response to a request, and generates a VD index picture from a moving picture.

Figure 3:
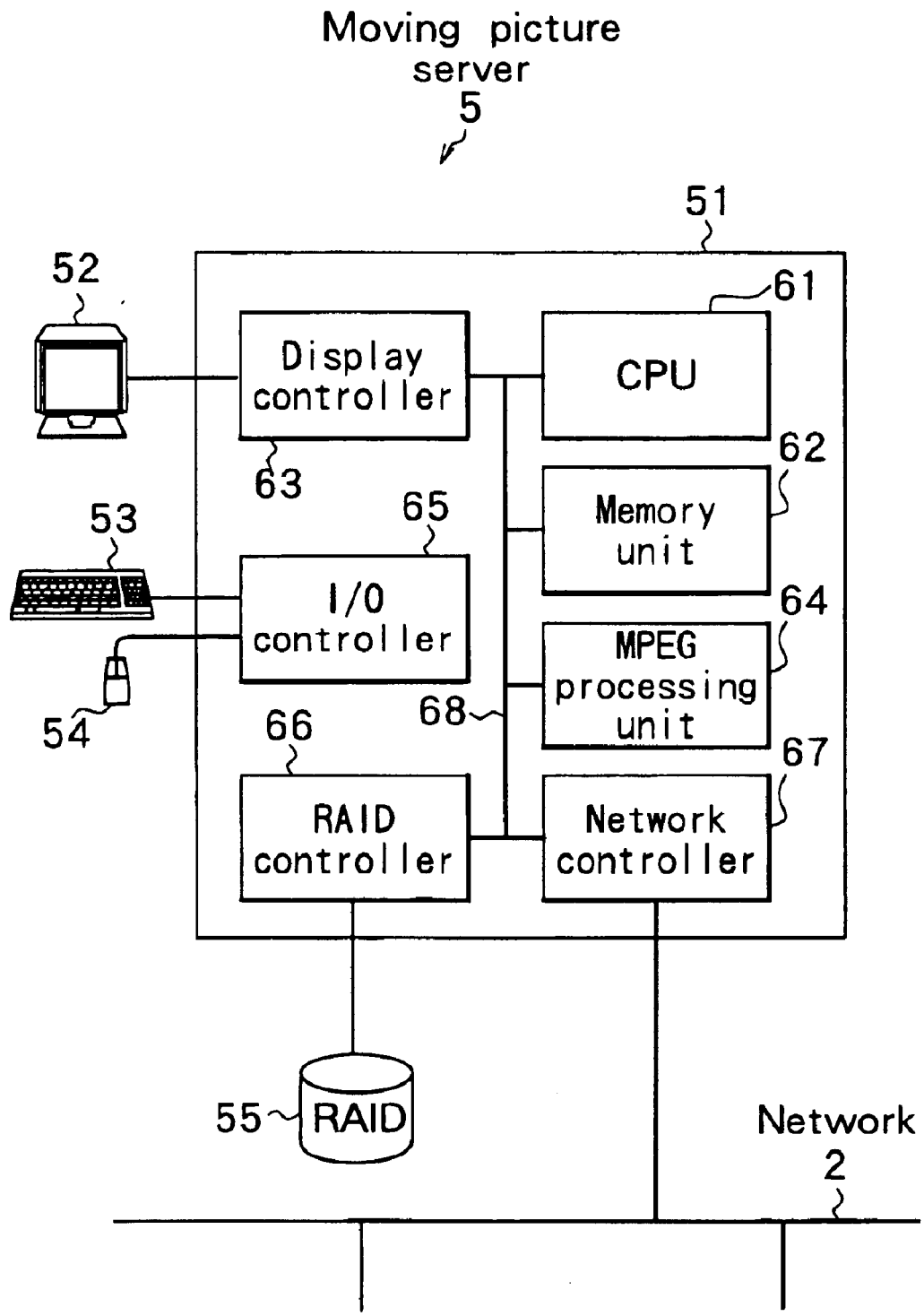
FIG. 3 is a block diagram showing the hardware configuration of a moving picture server.

FIG. 3 shows the hardware configuration of the moving picture server 5. As shown in the diagram, the moving picture server 5 comprises a computer unit 51, a display apparatus 52, a keyboard 53, a mouse 54, and a RAID (Redundant Array of Inexpensive Disks) 55 of a large capacity redundantly constructed by using a plurality of hard disks. The components 52 to 55 are connected to the computer unit 51.

The computer unit 51 comprises: a CPU 61; a memory unit 62 including a ROM, a RAM, and the like; a display controller 63 for controlling the display apparatus 52; an MPEG processing unit 64 for compressing and decompressing image data in compliance with the MPEG standard; an I/O controller 65 connected to the keyboard 53 and the mouse 54, for controlling an input/output operation; a RAID controller 66 for controlling the RAID 55; and a network controller 67 connected to the network 2, for controlling communications. The components are connected to each other via a bus 68. The CPU 61 executes an application program stored in the RAID 55 by using the RAM in the memory unit 62 as a working memory area. The MPEG processing unit 64 may be realized by hardware or software.

The functional configuration of the moving picture retrieving and distributing system of the embodiment will now be described.

FIG. 1 shows the functional configuration of components in the moving picture retrieving and distributing system shown in FIG. 2. As shown in the diagram, the web server 3 has an Internet server unit 71, a database searching unit 72, an index retrieving unit 73, an index storing unit 74, an index related process unit 75, an index related information storing unit 76, a GUI (Graphycal User Interface) data generating unit 77, a GUI data storing unit 78, and a still picture storing unit 79.

The Internet server unit 71 is used to, for instance, manage and distribute information to be made public on the Internet. Specifically, the Internet server unit 71 transmits/receives signals to/from the terminal device 4, the moving picture server 5, the database server 6 and the like.

The database searching unit 72 performs processes of generating a moving picture retrieval request to the database server 6 in accordance with a request from the terminal device 4 and transferring the obtained retrieval result to the index retrieving unit 73. The retrieval result includes the title of the corresponding moving picture, the file name of moving picture data, the name of the moving picture server in which the moving picture file is stored (the moving picture server 5 in this case), and a storage position of the moving picture file in the moving picture server.

The index retrieving unit 73 retrieves a target file from the plurality of VD index files stored in the index storing unit 74 on the basis of the database search result received from the database searching unit 72. As will be described hereinlater, the VD index file is an image data file generated every title of a moving picture and includes one or a plurality of VD index picture data.

The index storing unit 74 stores the VD index file sent from the moving picture server 5.

The index related process unit 75 performs a process of obtaining various display parameter information related to a display form of the VD index pictures, necessary for the GUI data generating unit 77 to generate GUI data. The display parameter information includes, for example, the number of displayable VD index pictures according to the size of the Internet browser screen (hereinbelow, simply called a browser screen) of the display apparatus 32 of the terminal device 4, numbers of the VD index pictures to be selected when the number of generated VD index pictures exceeds the number of displayable images, a display form of the VD index pictures according to the length of the moving picture, and the like. The VD index picture display form is used so that the user of the terminal device 4 can recognize the length of the corresponding moving picture only by seeing the display form of the VD index picture displayed on the browser screen of the display apparatus 32 by selectively using a part of the area in which the VD index pictures can be displayed according to the length of the moving picture.

The index related information storing unit 76 stores index related information sent from the moving picture server 5. The index related information is information including the number of VD index pictures generated by the index generating unit 87 in the moving picture server 5 and various generation parameters used to generate a VD index picture. The generation parameters includes, for example, the number of frames used to generate one VD index picture, the number of lines extracted per frame, and the direction of line extraction.

The GUI data generating unit 77 generates or updates GUI data constituting a homepage for moving picture retrieval provided to the terminal device 4 or the like. The data used to make the homepage for moving picture retrieval is usually described in HTML (Hyper Text Markup Language).

The GUI data storing unit 78 is an area for storing the GUI data generated by the GUI data generating unit 77.

The still picture storing unit 79 stores a still picture file sent together with the VD index file from the moving picture server 5. The still picture file is made by data of still pictures each of which is made associated with each of VD index pictures included in the VD index file. As the still picture data, for example, data compressed in the GIF (Graphics Interchange Format) is employed. The still picture storing unit 79 corresponds to an example of "index contents information holding means" in the invention and a still picture (to be accurate, an index representative still picture which will be described hereinlater) to be stored in the still picture storing unit 79 corresponds to an example of "index contents information" in the invention.

Among the functional units in the web server 3, the Internet server unit 71, database searching unit 72, index retrieving unit 73, index related process unit 75, and GUI data generating unit 77 are realized mainly by an application program stored in the hard disk drive 15 and the CPU 21 for executing the application program in FIG. 2. Each of the index storing unit 74, index related information storing unit 76, GUI data storing unit 78, and still picture storing unit 79 is realized by using a part of the hard disk drive 15 in FIG. 2.

The terminal device 4 has an Internet browser unit 81 and a moving picture reproducing unit 82.

The Internet browser unit 81 has a function of accessing the Internet by using the WWW and receiving and displaying information. As mentioned above, it is realized by a general commercial browser such as the Netscape Navigator.

The moving picture reproducing unit 82 decompresses the moving picture data distributed from the moving picture server 5 and displays the decompressed image. The moving picture reproducing unit 82 is mainly realized by the MPEG processing unit 44 in FIG. 2. The function of the moving picture reproducing unit 82 can be also realized by a program for reproducing a moving picture adapted to the contents type (for example, compression method) of the moving picture. The program for reproducing a moving picture is provided as, for example, plug-in software of the Internet browser.

The moving picture server 5 has a moving picture storing unit 85, a moving picture distributing unit 86 and the index generating unit 87.

The moving picture storing unit 85 is a part for storing a moving picture file and is realized by the RAID 55 in FIG. 3. The moving picture data included in the moving picture file is compressed in the MPEG format. The moving picture storing unit 85 corresponds to an example of "index contents information holding means" and moving picture data to be stored in the index contents information holding means corresponds to an example of "index contents information".

The moving picture distributing unit 86 takes a target moving picture from the moving picture storing unit 85 in response to a request from the terminal device 4 or the like and distributes the target moving picture to the terminal device 4 via the network 2.

The index generating unit 87 performs a process of generating VD index pictures as still pictures by visually summarizing the contents of the moving picture stored in the moving picture storing unit 85 and transmitting the VD index pictures as a VD index file to the web server 3 through the network 2. Specifically, the moving picture read from the moving picture storing unit 85 is decompressed by the MPEG processing unit 64 (FIG. 3) and processes which will be described hereinlater (refer to FIGS. 5A to 5C and FIGS. 6A to 6D) are performed on the decompressed moving picture, thereby generating the VD index pictures. The index generating unit 87 also has the function of transmitting the number of generated VD index pictures, the parameters used for generating the VD index picture, and the like as index related information to the web server 3. The generated VD index file is stored in the index storing unit 74 in the web server 3 and the index related information is stored in the index related information storing unit 76. The index storing unit 74 corresponds to an example of "index image holding means" in the invention.

The database server 6 has a database 91 and a searching unit 92.

The database 91 includes the title of a moving picture, the file name of the moving picture, the name of a moving picture server storing the moving picture file (in this case, the moving picture server 5), and the storing position of the moving picture file in the moving picture server.

The searching unit 92 searches the database 91 on the basis of a given keyword in response to a request from the database searching unit 72 in the web server 3 and transmits the search result to the database searching unit 72. The searching unit 92 is realized by, for example, a Database Management System (DBMS) program such as Sybase (trademark of Sybase Inc., U.S.A.).

Figure 4:
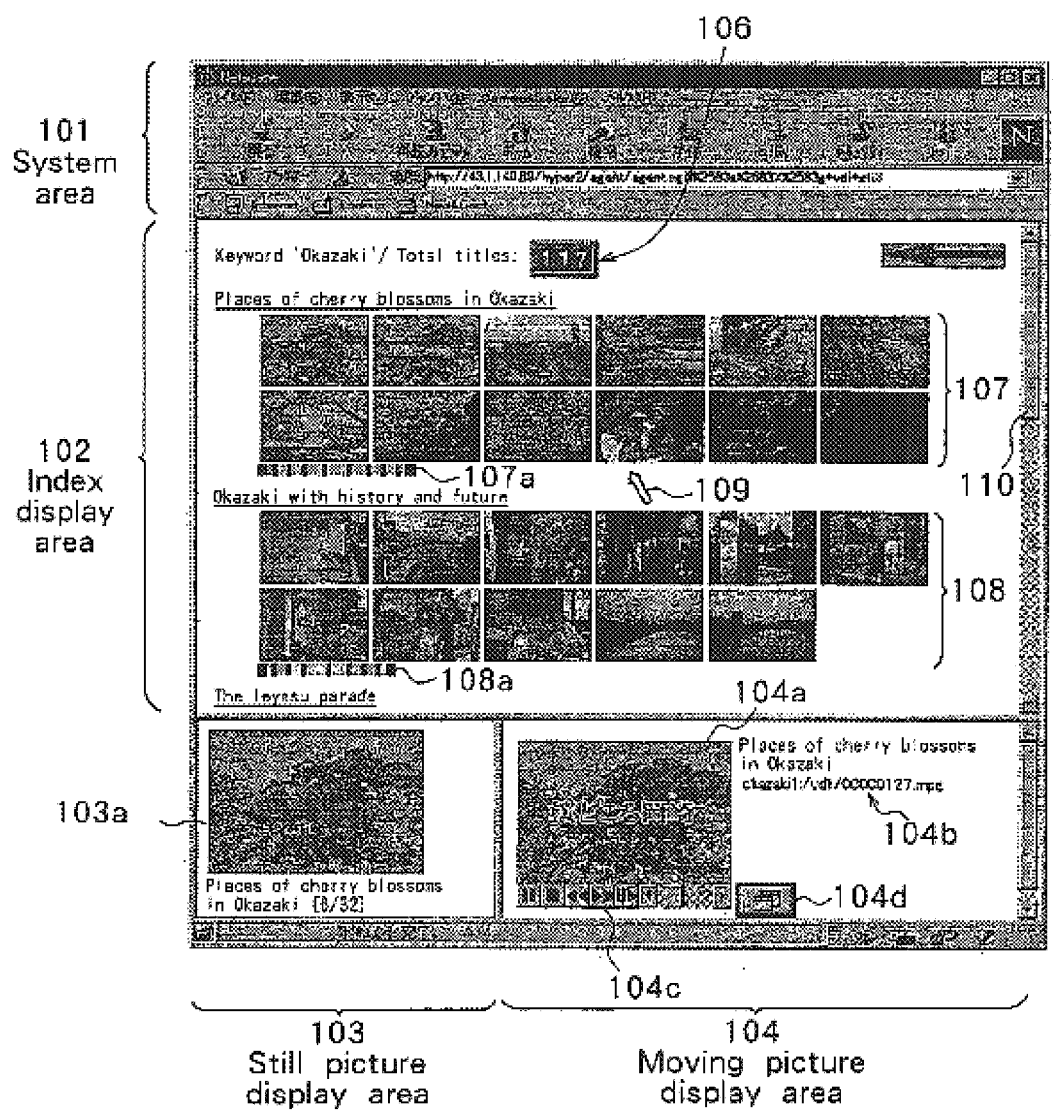
FIG. 4 is a representation showing an example of an Internet browser screen displayed on a display apparatus of the terminal device.

FIG. 4 shows an example of the Internet browser screen displayed on the display apparatus 32 of the terminal device 4. The browser screen is realized by the function of the Internet browser unit 81. Mainly, the display apparatus 32 corresponds to an example of "display means" in the invention and the Internet browser unit 81 corresponds to an example of "control means" in the invention.

The browser screen includes a system area 101 comprising a browser title bar, a menu bar, and a tool bar, an index display area 102 for displaying the VD index pictures as the retrieval result and the like, a still picture display area 103 for displaying a still picture (to be accurate, an index representative still picture which will be described hereinlater), and a moving picture display area 104 for reproducing and displaying a moving picture.

The menu bar in the system area 101 has menu items such as "file", "edit", "display", and so on. By mouse clicking a menu item, a pull-down menu is displayed. In the tool bar, tool icons such as "back" and "refresh" are arranged. By mouse clicking a tool icon, a corresponding browser operation is performed. The mouse click denotes a click on, for example, the left button of the mouse 34 in a state where a mouse pointer 109 is on the target item. In the following description, the operation will be simply described as a click.

In the index display area 102, the keyword used for retrieval, the number 106 of titles of the moving pictures retrieved, VD index picture groups 107 and 108 of the retrieved moving pictures, and the like are displayed. In the example shown in the diagram, 117 moving pictures are retrieved for the keyword 'Okazaki'. Among them, the VD index picture groups 107 and 108 of the moving pictures of the titles of 'places of cherry blossoms in Okazaki' and 'Okazaki with history and future' are displayed. One VD index picture group corresponds to the moving pictures of one title. Indicator bars 107a and 108a each corresponding to the length of all the corresponding moving pictures (total reproduction time) are disposed below the VD index picture groups. Black frame parts in the indicator bars 107a, 108a, and the like indicate the places of the VD index pictures displayed above in all the VD index pictures. In the index display area 102, by operating a scroll bar 110 at the right end, a plurality of VD index picture groups are scrolled in the vertical direction and can be sequentially displayed. The index display area 102 corresponds to an example of "first display area" in the invention.

In the still picture display area 103, a still picture 103a corresponding to the selected one of the VD index pictures displayed in the index display area 102 is displayed. The still picture 103a is an index representative still picture which will be described hereinlater. In the embodiment, for example, only by moving the mouse pointer 109 onto a desired VD index picture by operating the mouse 34, the VD index picture is selected.

In the moving picture display area 104, a moving picture 104a corresponding to the selected one of the VD index pictures displayed in the index display area 102 is displayed together with the title name and a moving picture file name 104b. In the embodiment, for example, by moving the mouse pointer 109 on a desired VD index picture and clicking the mouse button, the moving picture corresponding to the VD index picture is selected. The reproduction start point in this case is the head of a moving picture period corresponding to the clicked VD index picture. Alternatively, any point except for the head of the moving picture period can be as the reproduction start point. Operations of reproduction, stop, temporarily stop, high-speed reproduction, reverse reproduction, high-speed reverse reproduction, and the like of the moving picture 104a can be performed by an operation unit 104c. By clicking an enlargement and display icon 104d, the moving picture 104a can be enlarged and displayed on the full browser screen.

The still picture display area 103 or the moving picture display area 104 corresponds to an example of "second display area" in the invention.

The operation of the moving picture retrieving and distributing system with the configuration will now be described.

Figure 5A:
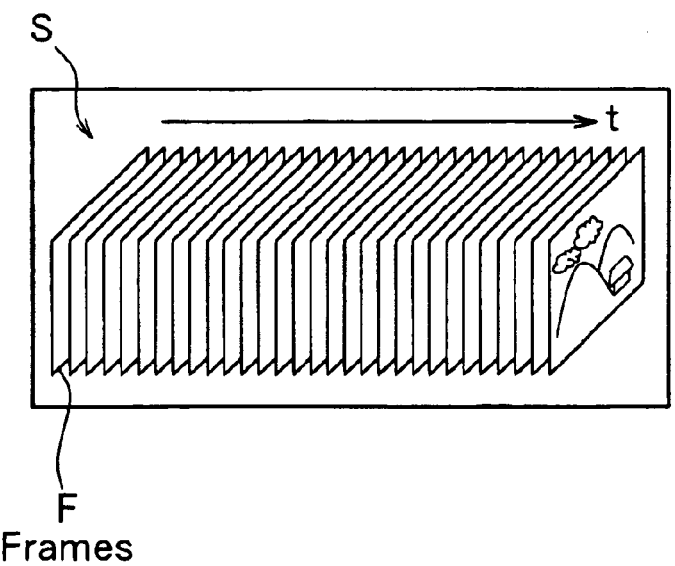
FIGS. 5A to 5C are explanatory diagrams showing the schematic procedure of generating a group of VD index pictures from a series of moving pictures.
Figure 5B:
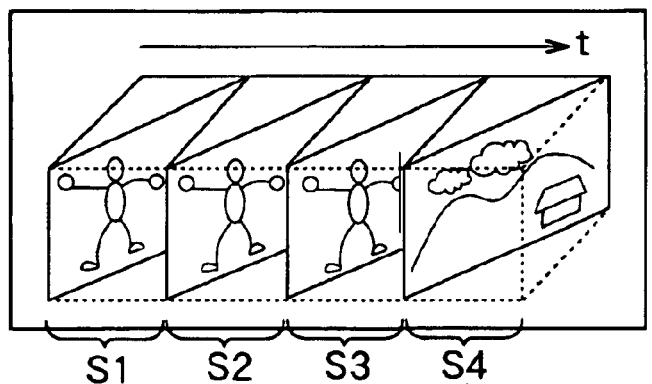
Figure 5C:
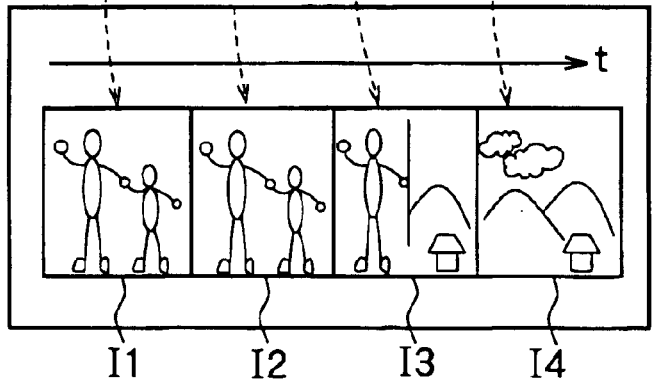

Referring to FIGS. 5A to 5C and FIGS. 6A to 6C, first, the VD index picture generating process performed by the index generating unit 87 in the moving picture server 6 will be described. FIGS. 5A to 5C show a rough procedure of generating a plurality of VD index pictures from a series of moving pictures. FIGS. 6A to 6C show a procedure of generating one VD index picture from moving pictures in a certain period.

As shown in FIGS. 5A and 6A, a moving picture is defined as a rectangular parallelepiped model in which two-dimensional still pictures Fi (i=1, 2, . . . ) are arranged along the time-axis (t). Hereinafter, the two-dimensional still picture will be also called a frame. For example, in the case of the NTSC (National Television System Committee) system, each frame is comprised of two fields each having a length of 1/60 second, so that one frame has a length of 1/30 second.

As shown in FIG. 5B, the rectangular parallelepiped model formed by a series of moving pictures is divided into a plurality of partial rectangular parallelepipeds Si (in the diagram, i=1 to 4) at predetermined time intervals. Each partial rectangular parallelepiped Si is cut diagonally along its diagonal face and image information in a slit shape on each section face (hereinbelow, called slit image information) is extracted. In practice, as shown in FIG. 6B, frames Fj (j=1, 2, . . . ) are extracted from one partial rectangular parallelepiped. Further, as shown in FIG. 6C, slit image information SLj is sequentially cut from the frames Fj by using a moving slit window which moves with time.

As shown in FIG. 6D, the slit image information SLi extracted from the sections is sequentially arranged up to a predetermined size and is subjected to a predetermined compressing process. As shown in FIG. 5C, each of VD index pictures Ii (i=1 to 4) is consequently generated from each partial rectangular parallelepiped Si and a plurality (four in the diagram) of VD index pictures are generated as a whole moving picture. At this time, one frame included in the original partial rectangular parallelepiped Si (that is, the original still picture which has not been subjected to the extracting process with the slit window) is correlated with each VD index picture and is registered as an index representative still picture. As the index representative still picture, for example, a frame (frame F5 in FIG. 6D) provided to generate the center part of the VD index picture is selected. A frame provided to generate another part (such as an end part) of the VD index picture may be also selected.

In the example shown in FIGS. 5A to 5C and FIGS. 6A to 6C, the slit image information SLj is extracted from the frames Fj constructing the moving picture by using the moving slit window elongated in the perpendicular direction (vertical direction). The slit image information SLj may be also extracted by a moving slit window elongated in the horizontal direction (lateral direction). The slit image information SLj may not be directly extracted from the frames Fj constructing the moving picture. It is also possible to set only a main part (for example, a central area) in the frames Fj as a range to be extracted and to put the other area (for example, peripheral areas) out of the object to be extracted. Further, not only the index representative still picture but also original frames may be mixed in the VD index pictures.

Referring to FIGS. 7 and 8, the general operation of the moving picture retrieving and distributing system with the above configuration will now be described. FIGS. 7 and 8 show a series of operations in each of the web server 3, the terminal device 4, the moving picture server 5 and the database server 6. A series of operations of retrieving the VD index picture of the corresponding moving picture by the web server 3 and the database server 6 in response to a retrieval request from the terminal device, displaying the retrieved VD index picture on the browser screen of the terminal device 4, displaying an index representative still picture corresponding to the selected one of the displayed VD index pictures and further, reproducing and displaying the moving picture corresponding to the selected VD index picture will be described. It is assumed that the VD index pictures of the moving picture stored in the moving picture storing unit 85 in the moving picture server 5 have been already stored in the index storing unit 74 in the web server 3 and the index representative picture is stored in the still picture storing unit 79.

When the Internet browser unit 81 is activated in the terminal device 4 (S1 in FIG. 7), the Internet browser unit 81 accesses the web server 3 via the network 2 (S2). When accessed by the terminal device 4, the Internet server unit 71 in the web server 3 reads the GUI data used to describe the homepage for moving picture retrieval from the GUI data storing unit 78 and distributes the read GUI data to the terminal device 4 (S3).

The Internet browser unit 81 in the terminal device 4 displays an initial screen (not shown) of the homepage for moving picture retrieval on the browser screen of the display apparatus 32 (FIG. 2) on the basis of the GUI data sent from the web server 3 (S4).

When a moving picture retrieval keyword (hereinbelow, simply called a keyword) is entered (S5), the Internet browser unit 81 transmits the entered keyword together with the moving picture retrieval request to the web server (S6).

Upon receipt of the moving picture retrieval request and the keyword from the terminal device 4, the Internet server unit 71 in the web server 3 activates the database searching unit 72. The database searching unit 72 transmits a moving picture information retrieval command code together with the keyword to the database server 6 via the Internet server unit 71 and the network 2 (S7).

The searching unit 92 in the database server 6 searches the database 91 on the basis of the received keyword and transmits the search result to the web server 3 (S8).

The web server 3 which has received the search result from the database server 6 activates the index retrieving unit 73. The index retrieving unit 73 retrieves the corresponding VD index file from the index storing unit 74 on the basis of the search result from the database server 6 (S9) and transfers the VD index file to the GUI data generating unit 77.

The GUI data generating unit 77 generates the GUI data on the basis of the search result from the database server and the result from searching the index storing unit (S10). The GUI data includes the title name of the moving picture, the moving picture file name, the storage place of the moving picture file in the moving picture server 5, the VD index picture and the like.

Upon generation of the GUI data, the display parameter information including the display format of the VD index picture, the display number, and arrangement, obtained by the index related process unit 75 is referred to. Based on this information, GUI data which can realize an optimum screen layout according to the length of a moving picture, the size of the browser screen of the display apparatus 32 of the terminal device 4, and so on is generated. The display parameter information is generated by the index related process unit 75 on the basis of data indicative of the size of the browser screen of the display apparatus 32 of the terminal device 4 and data indicative of the length of the retrieved moving picture, and the like, sent from the terminal device 4, in response to the request of the web server 3.

The GUI data generating unit 77 stores the generated GUI data into the GUI data storing unit 78 and transmits it as a retrieval result to the terminal device 4 (S11).

The Internet browser unit 81 in the terminal device 4 receives the GUI data sent from the web server 3 and, on the basis of the data, as shown in FIG. 4, displays the keyword, the number 106 of corresponding moving pictures, the title names of the moving pictures, and the VD index picture groups 107 and 108 as the contents of the retrieval result in the index display area 102 on the retrieval result display screen (S12).

The Internet browser unit 81 of the terminal device 4 monitors the position of the mouse pointer 109 and whether the mouse is clicked or not. When it is determined that the mouse pointer 109 (FIG. 4) is on any of the VD index pictures and the mouse is not clicked, information for specifying the VD index picture (hereinbelow, called index specifying information) is obtained (S13 in FIG. 8). The index specifying information includes, for example, the VD index file name and serial numbers designated to the VD index pictures. The Internet browser unit 81 transmits a request of transmitting the index representative still picture together with the index specifying information to the web server 3 (S14).

The Internet server unit 71 in the web server 3 obtains the index representative still picture requested by the terminal device 4 from the still picture storing unit 79 and transmits it to the terminal device 4 (S15).

The Internet browser unit 81 of the terminal device 4 receives the index representative sill picture sent from the web server 3 and displays it in the still picture display area 103 (FIG. 4) of the browser screen (S16).

Further, the Internet browser unit 81 of the terminal device 4 monitors the position of the mouse pointer and whether the mouse is clicked or not. When it is determined that the mouse pointer 109 (FIG. 4) is on any of the VD index pictures and the mouse is clicked, index specifying information with respect to the VD index picture is obtained (S17). The Internet browser unit 81 transmits a request of transmitting a moving picture reproduction command code together with the obtained index specifying information to the web server 3 (S18).

When the request of transmitting the moving picture reproduction command code and the index specifying information sent from the terminal device 4 are received, the Internet server unit 71 in the web server 3 specifies the corresponding moving picture on the basis of the VD index specifying information, generates a moving picture reproduction command code including the moving picture file name, moving picture file storing position, and reproduction start position and transmits the moving picture reproduction command code to the terminal device 3 (S19).

The Internet browser unit 81 in the terminal device 4 receives the moving picture reproduction command code from the web server 3 and, on the basis of it, requests the moving picture server 5 to distribute moving pictures (S20).

The moving picture distributing unit 86 in the moving picture server 5 retrieves the corresponding moving picture from the moving picture storing unit 85 on the basis of the moving picture reproduction command code sent from the terminal device 4 and distributes it to the terminal device 4 in real time (S21). At this time, the moving picture distributing unit 86 takes the moving picture data in the moving picture storing unit 85 in a compressed state from the reproduction start position designated by the moving picture reproduction command code and distributes it.

The moving picture reproducing unit 82 in the terminal device 4 displays the moving picture 104a in the moving picture display area 104 (FIG. 4) on the browser screen while performing a decompressing process or the like on the moving picture data distributed from the moving picture server 5 (S22). In this case, the reproduction start position of the moving picture is, for example, the position corresponding to the head portion of the selected VD index picture.

In this state, when the operating unit 104c is operated by the mouse pointer 109 to perform replay, stop, pause, high-speed replay, reverse replay, high-speed reverse replay, or the like, the Internet browser unit 81 transmits the command code corresponding to each operation to the moving picture server 5. The moving picture distributing unit 86 in the moving picture server 5 which has received the command code reproduces the moving picture in the moving picture storing unit 85 in a manner according to the command code and distributes the reproduced moving picture to the terminal device 4. Those operations are executed almost real time. When the enlargement and display icon 104d in FIG. 4 is clicked, the Internet browser unit 81 enlarges and displays the moving picture 104a on the full browser screen.

Figure 9:
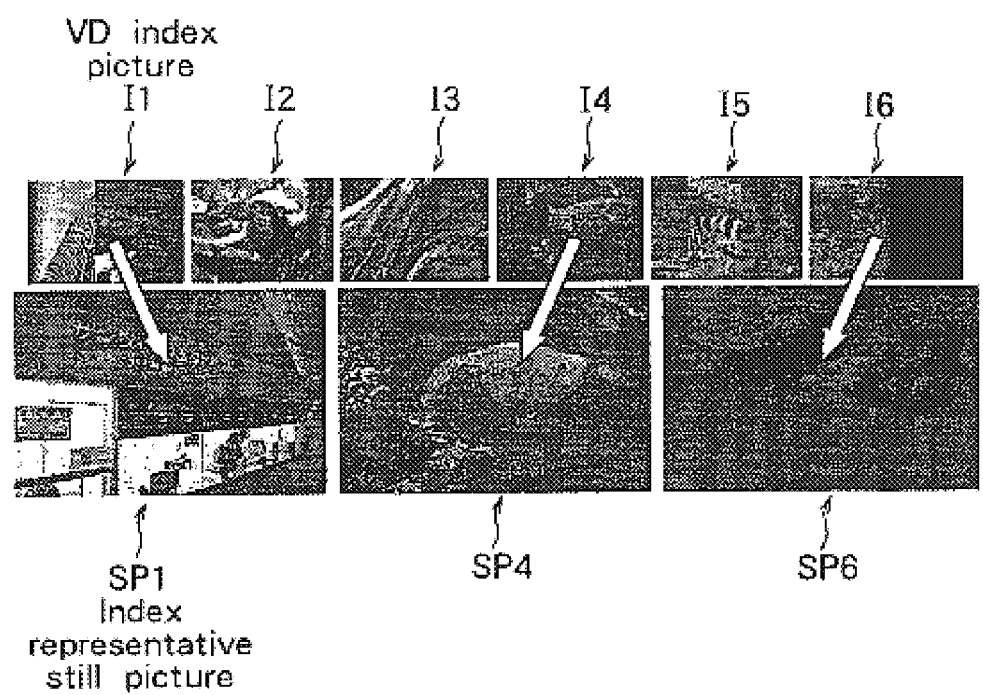
FIG. 9 is an explanatory diagram showing a state where an index representative still picture is displayed in correspondence with a selected VD index picture.

FIG. 9 shows a state where a corresponding index representative still picture is displayed when any of the VD index pictures displayed on the browser screen of the terminal device 4 is selected. The diagram shows a state where, for example, when VD index pictures I1, I4, and I6 are selected from the VD index pictures I1 to I6, index representative still pictures SP1, SP4, and SP6 corresponding to the VD index pictures I1, I4, and I6 are displayed.

As illustrated in the diagram, for instance, the VD index picture I1 is generated from a moving picture having two scene changes around the central part in the moving picture period (that is, a moving picture including short images). It is not therefore easy to grasp the contents of the moving picture in the period only by the index representative still picture SP1. In such a case, when the mouse pointer is moved onto the VD index picture I1, the original still picture which is not summarized is displayed as the index representative still picture SP1. Consequently, the contents can be accurately grasped. The other VD index pictures I2 to I6 are similar to the above.

As described above, according to the moving picture retrieving and distributing system of the embodiment, when any of the VD index pictures displayed on the browser screen on the terminal device 4 is selected, the corresponding index representative still picture is displayed. For example, like a quick moving picture, even a moving picture whose contents cannot be easily grasped only by the VD index picture, the contents can be easily recognized at a glance. Moreover, the VD index picture is selected only by moving the mouse pointer, so that the operation is extremely simple.

According to the moving picture retrieving and distributing system of the embodiment, by selecting any of the VD index pictures displayed on the browser screen of the terminal device 4, display of the corresponding moving picture is started from the part corresponding to the selected VD index picture. Consequently, reproduction from a scene desired by the user can be realized.

As compared with a case of performing reproduction from a some midpoint by moving the cursor on the scroll bar described in the related art, a moving picture can be reproduced more promptly from an accurate midpoint.

Although the invention has been described by the embodiment, the invention is not limited to the embodiment but can be variously modified.

For example, although the number of index representative still image registered in correspondence with the VD index picture and displayed is one in the embodiment, the invention is not limited to the number but the number may be two or more. For example, it is also possible to register three index representative still pictures provided to generate picture portions in three positions of both ends and the central portion of the VD index picture every VD index picture and select the VD index picture by the mouse pointer to thereby display the three index representative still pictures. In this case, the contents of the VD index picture can be more accurately grasped by a larger number of index representative still pictures.

In the foregoing embodiment, the reproduction start position of a moving picture is a position corresponding to the head portion of a selected VD index picture. The reproduction may be also started from a position corresponding to another portion (such as a central portion) of a selected VD index picture.

In the foregoing embodiment, "index contents information" displayed on the browser screen in accordance with the selection of the VD index picture is either an index representative still picture or a moving picture. Besides, the index related information as text information stored in the index related information storing unit 76 in the web server 3 may be displayed as "index contents information" so as to correspond to a selected VD index picture.

In this case, for example, text information such as information indicative of the portion of a VD index picture in a whole moving picture (such as reproduction elapsed-time starting from the head of the moving picture) and the name of each VD index picture and the like is added every VD index picture. The information is included in the index related information. When the VD index picture is transmitted from the web server 3 to the terminal device 4, the index related information is also sent. In the Internet browser unit 81 in the terminal device 4, it is sufficient to display the information indicative of the reproduction elapsed-time, and the like included in the received index related information near the corresponding VD index picture displayed in the index display area 102 on the browser screen of the terminal device 4. The user can therefore know the information related to each VD index picture as well. In such a case, the index related information storing unit 76 corresponds to an example of "index contents information holding means" in the invention. The index related information corresponds to an example of "index related information" as one of "index contents information" in the invention.

Although the index generating unit 87 is disposed in the moving picture server 5 in the embodiment, it may be disposed in the web server 3. Alternatively, it is also possible to use only the index generating unit 87 as an independent server and connect it to the network 2.

In the embodiment, the index storing unit 74 as index picture holding means; the still picture storing unit 79, the moving picture storing unit 85 or the index related information storing unit 76 as index contents information holding means; the display apparatus 32 as displaying means; and the Internet browser unit 81 as control means, which are components of the image display apparatus according to the invention, are disposed so as to be dispersed to the web server 3, the moving picture server 5, and the terminal device 4. The components are connected to each other via the network 2. It is also possible to mount all the components in the same apparatus which operates as a standalone image display apparatus.

As described above, in the image display apparatus according to any one of claims 1 to 6 or the image displaying method according to any one of claims 7 to 11, for each index picture generated by summarizing a moving picture, the index contents information related to the contents of an index picture is held, and both the operation of displaying the index picture to the first display area of the display means and the operation of displaying the index contents information to the second display area of the display means are controlled by the control means. Consequently, not only the index picture but also the index contents information regarding the contents of the index picture can be seen. An effect such that the contents of the original moving picture can be more easily grasped as compared with the case of displaying only the index picture is produced.

In particular, in the image display apparatus according to claim 2 or the image displaying method according to claim 7, in response to a selection of any of displayed index pictures, the index contents information of the selected index picture is displayed. An effect such that the user can display the index contents information of only a necessary part to check the details while viewing a whole moving picture is produced.

In the image display apparatus according to claim 3 or the image displaying method according to claim 8, the index contents information is of any of still pictures used to generate a corresponding index picture. There is consequently an effect such that, even if it is difficult to recognize the contents from an index picture, the contents of the moving picture can be easily grasped by seeing a still picture.

In the image display apparatus according to claim 4 or the image displaying method according to claim 9, the index contents information is of a moving picture as a source of an index picture. There is consequently an effect such that the user can replay and display an original moving picture while checking the rough contents of the moving picture by the index picture.

In the image display apparatus according to claim 5 or the image displaying method according to claim 10, the index contents information is of a moving picture as a source of an index picture and the moving picture is reproduced and displayed from a part corresponding to a selected index picture, so that the following effect is produced. When the user views the index picture and finds a desired scene, a moving picture can be immediately reproduced and displayed from the scene and it is very convenient for the user.

In the image display apparatus according to claim 6 or the image displaying method according to claim 11, the index contents information is index related information related to a corresponding index picture. There is consequently an effect such that not only the index picture but also the index related information can be watched and it helps the user to grasp the contents of the moving picture.

Obviously many modifications and variations of the present invention are possible in the light of the above teachings. It is therefore to be understood that within the scope of the appended claims the invention may be practiced otherwise than as specifically described.

What is claimed is:

1. An image display apparatus comprising:
   a plurality of moving pictures each of which comprises a plurality of predefined slit sections;
   index picture holding means for holding an index picture as a still picture;
   wherein less than all of said predefined slit sections of each of said plurality of moving pictures are included in said index picture by sequentially combining the included predefined slit sections of each of said plurality of said moving pictures;
   index contents information holding means for holding index contents information regarding the contents of each of index pictures held in the index picture holding means;
   display means having a first display area where the index picture held in the index picture holding means is displayed and a second display area where the index contents information held in the index contents information holding means is displayed; and
   control means for controlling a display operation in the display means.

2. The image display apparatus according to claim 1, further comprising selecting means for selecting any of the index pictures displayed in the first display area, wherein the control means has a function of reading the index contents information regarding the index picture selected by the selecting means from the index contents information holding means and displaying the read information in the second display area.

3. The image display apparatus according to claim 2, wherein the index contents information is of a moving picture as a source of the index picture, and the control means controls the display means so as to start reproduction and display of the moving picture from a part corresponding to the index picture selected by the selecting means.

4. The image display apparatus according to claim 1, wherein the index contents information is of any of still pictures used to generate a corresponding index picture.

5. The image display apparatus according to claim 1, wherein the index contents information is of a moving picture as a source of the index picture.

6. The image display apparatus according to claim 1, wherein the index contents information is index related information which is information related to a corresponding index picture.

7. An image displaying method comprising the steps of:
   a plurality of moving pictures each of which comprises a plurality of predefined slit sections;
   holding an index picture as a still picture;
   wherein less than all of said predefined slit sections of each of said plurality of moving pictures are included in said index picture by sequentially combining the included predefined slit sections of each of said plurality of said moving pictures;
   holding index contents information regarding the contents of each of index pictures;
   displaying the index pictures in time sequence;
   selecting one of the displayed index pictures; and
   displaying the index contents information corresponding to the selected index picture.

8. The image displaying method according to claim 7, wherein the index contents information is of any of still pictures used to generate a corresponding index picture.

9. The image displaying method according to claim 7, wherein the index contents information is of a moving picture as a source of the index picture.

10. The image displaying method according to claim 7, wherein the index contents information is of a moving picture as a source of the index picture, and reproduction and display of the moving picture is started from a part corresponding to the selected index picture.

11. The image displaying method according to claim 7, wherein the index contents information is index related information which is information related to a corresponding index picture.

* * * * *